United States Patent [19]

Buechler et al.

[11] Patent Number: 5,322,100
[45] Date of Patent: Jun. 21, 1994

[54] FUEL FILLER MODULE

[75] Inventors: Jeffrey L. Buechler, Garden City, Mich.; Eric A. Langley, York Town, Ind.

[73] Assignee: Borg-Warner Automotive, Inc., Sterling Heights, Mich.

[21] Appl. No.: 9,808

[22] Filed: Jan. 27, 1993

[51] Int. Cl.$^5$ .............................. B67D 5/06
[52] U.S. Cl. .............................. 141/312; 141/307; 141/326; 141/348; 137/588; 220/86.2; 220/746
[58] Field of Search ............. 141/44, 45, 59, 285, 141/286, 290, 301, 302, 307, 312, 325–327, 348–350, 368–371, 375; 220/86.2, 746; 137/587–589

[56] References Cited

U.S. PATENT DOCUMENTS

| | | | |
|---|---|---|---|
| 4,724,861 | 2/1988 | Covert et al. | 141/302 X |
| 4,762,247 | 8/1988 | Temmesfeld | 220/86.2 X |
| 4,798,306 | 1/1989 | Giacomazzi et al. | 141/286 X |
| 4,813,453 | 3/1989 | Jenkins et al. | 137/588 |
| 4,893,643 | 1/1990 | Gifford et al. | 137/202 |
| 4,966,299 | 10/1990 | Teets et al. | 141/307 X |
| 5,027,868 | 7/1991 | Morris et al. | 141/59 |
| 5,040,575 | 8/1991 | Oeffling et al. | 141/44 |

*Primary Examiner*—J. Casimer Jacyna
*Attorney, Agent, or Firm*—Reising, Ethington, Barnard, Perry & Milton

[57] ABSTRACT

A fuel filler module fits in the filler pipe of an automotive fuel tank and includes a spring biased trap door that cooperates with a fuel nozzle restrictor to seal an open end of the filler pipe automatically when a fuel nozzle is withdrawn. The fuel filler module also includes a fuel nozzle guide that is part of a vent system for venting the fuel tank during the refuelling process and a splash guard feature that prevents splash back at the end of the refuelling process. The fuel filler module comprises four-snap together components that are largely plastic parts or assemblies of plastic parts that are designed for easy molding to facilitate economical manufacture.

10 Claims, 2 Drawing Sheets

FUEL FILLER MODULE

BACKGROUND OF THE INVENTION

This invention relates to fuel systems and more particularly to a fuel filler module for the filler pipe of a automotive fuel tank or the like.

Automotive fuel tanks are refuelled by means of a filler pipe that carries a detachable cap at the open end of the filler pipe. This detachable gas cap is customarily designed to seal the open end of the filler pipe when it is installed. However, there are instances when the gas cap is not properly installed after refuelling or forgotten altogether.

This is an undesirable situation for many reasons particularly for automotive vehicles that have an onboard diagnostic system that requires the filler pipe to be sealed in order to function properly.

SUMMARY OF THE INVENTION

The object of this invention is to provide a fuel filler module for the filler pipe of an automotive fuel tank or the like that automatically seals the open end of the filler pipe when the fuel nozzle is withdrawn so that filler pipe is sealed even if the gas cap is not installed properly or forgotten altogether.

A feature of the fuel filler module of the invention is that the fuel filler module is installed in the filler pipe of an automotive fuel tank, easily.

Another feature of the fuel filler module of the invention is that the fuel filler module includes a spring biased trap door that cooperates with a fuel nozzle restrictor to seal the open end of the filler pipe automatically when a fuel nozzle is withdrawn.

Another feature of the fuel filler module of the invention is that the fuel filler module includes a fuel nozzle guide that is part of a vent system for venting the fuel tank during the refuelling process.

Yet another feature of the fuel filler module of the invention is that the fuel filler module includes a fuel nozzle guide that provides a splash guard feature that prevents splash back at the end of the refuelling process.

Still yet another feature of the invention is that the fuel filler module comprises four-snap together components that are largely plastic parts or assemblies of molded plastic parts that are designed for easy molding to facilitate economical manufacture.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
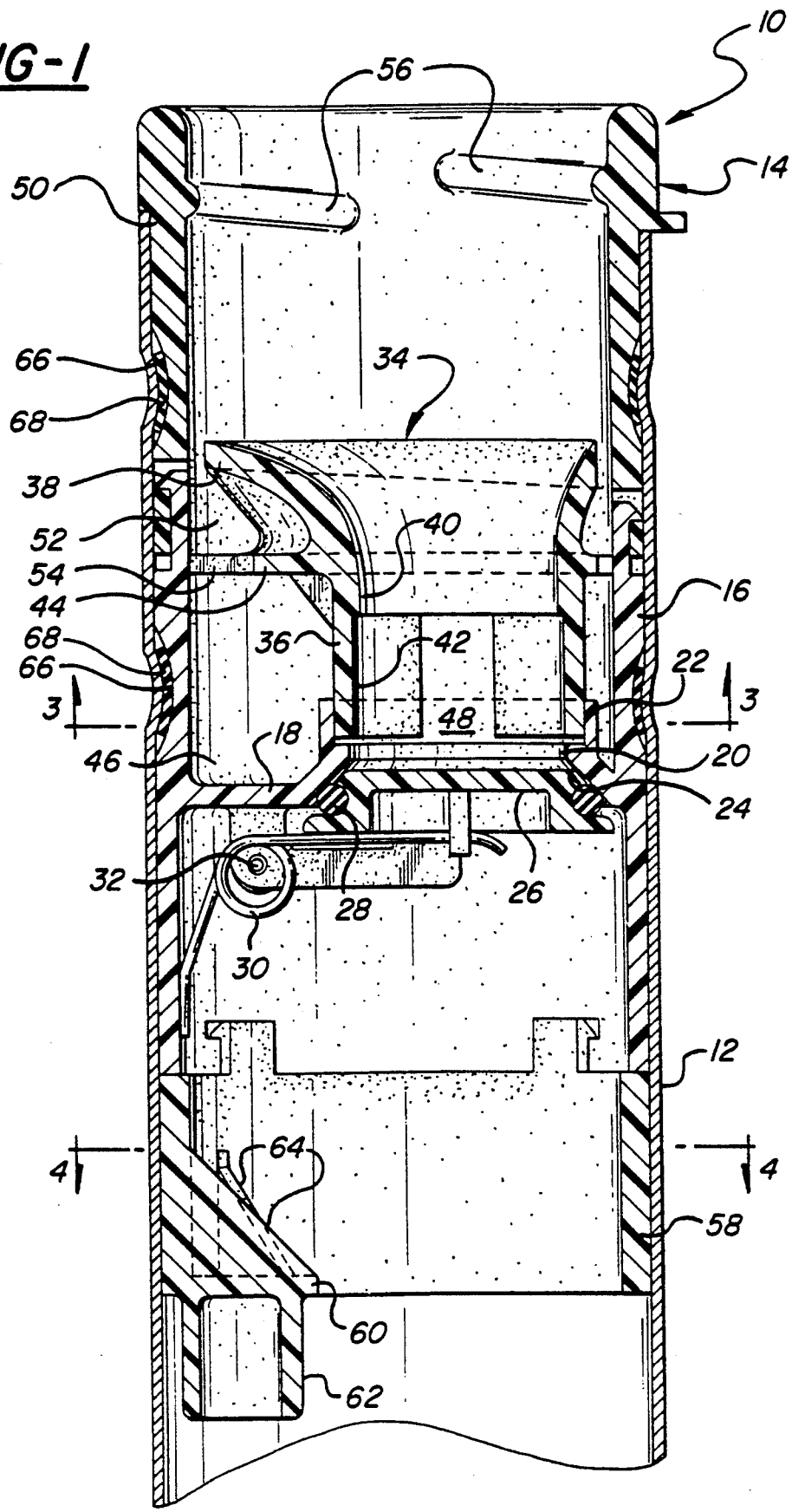
FIG. 1 is a longitudinal section of a fuel tank filler pipe which has a fuel filler module of the invention installed in it.

Referring now to the drawing a fuel filler module 10 of the invention in installed in the inlet end of a filler pipe 12 of an automotive fuel tank or the like (not shown).

The fuel filler module 10 has several functions. It limits access to fuel nozzles of a predetermined maximum size, for instance, to insure that leaded gasoline is not used in vehicles that require unleaded gasoline. The fuel filler module 10 vents the fuel tank and prevents splash back during the fuelling process. And finally the fuel filler module 10 seals the inlet end of the filler pipe 12 automatically when the fuel nozzle is withdrawn. Consequently tests that require a sealed inlet, such as those conducted by an onboard evaporative system monitor or other vehicle diagnostic systems can function properly even when the gas cap is not properly installed or missing altogether.

The fuel filler module 10 is a snap-together assembly of four components that are largely molded plastic parts or assemblies of molded plastic parts. The plastic parts are made of acetal copolymer resins or other suitable thermoplastic materials and are designed for easy molding.

The core component is a door housing assembly 14 that comprises a tubular housing 16 that has a partition wall 18 that separates the housing into an inlet side and an outlet side. The partition wall 18 has an aperture 20 that extends through it for receiving and venting around a nozzle of predetermined size. (The aperture 20 may in accordance with well know convention be sized to receive and vent around a fuel filler nozzle of predetermined maximum size, i.e. a fuel nozzle for unleaded gasoline.)

The inlet side of the partition wall 18 has a collar 22 in a surrounding spaced relationship with the aperture 20. The outlet side has a conical valve seat 24 surrounding the aperture 20 which cooperates with a trap door 26. The trap door 26 is pivotally mounted in the outlet side of the housing 16 by means of a hinge pin arrangement so that the trap door 26 moves between a generally vertical open position (not shown) and a generally horizontal closed position where the trap door 26 is seated on the valve seat 24.

The trap door 26 has a matching conical face for engaging the conical valve seat 24 that is grooved to carry a seal ring 28 that is made of nitrile or other suitable elastomer. The seal ring 28 seals the interface between the conical face and the conical valve seat 24 when the trap door 26 is biased in the closed position by a spring 30 that is mounted in the outlet side of the housing 16.

Figure 2:
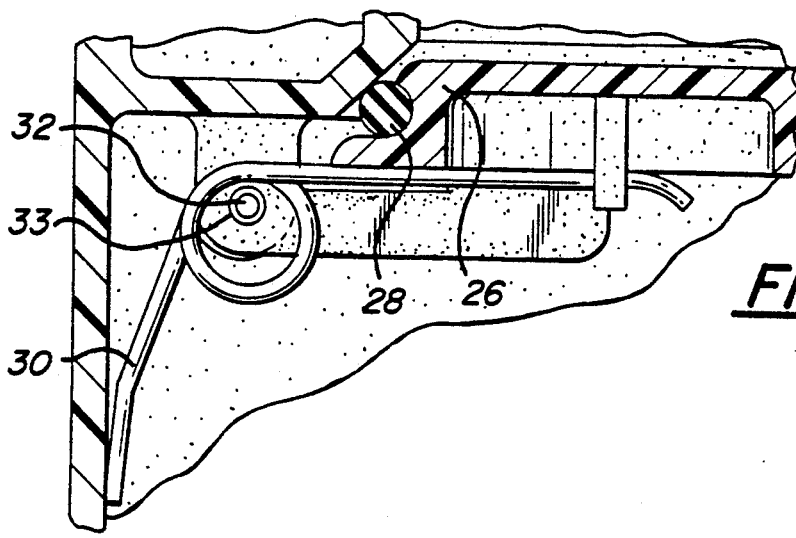
FIG. 2 is an enlargement of a portion of FIG. 1.

The hinge pin arrangement for the trap door 26 includes a hinge pin 32 that is disposed in aligned holes in a clevis part of the trap door 26 and in reinforced parts of the housing 16. The holes 33 in the clevis part of the trap door 26 are oversize as shown in FIG. 2 so the trap door 26 is pivotally mounted in the outlet side of the door housing 16 loosely and consequently the trap door 26 centers itself on the conical valve seat 24 when the trap door 26 is in the closed position.

The tubular housing 16 and the trap door 24 are both configured for easy molding to facilitate economical manufacture. Furthermore, the door housing assembly 14 itself can be leak tested before assembly of the remaining components which further enhances manufacturing economy and efficiency.

The second component is a nozzle guide 34 that is disposed in the inlet side of the housing 16. The nozzle guide 34 has a tube 36 at one end that fits in the collar 22 and a bell 38 at the opposite end that leads to an internal throat 40. The throat 40 is sized to fit closely around a fuel nozzle of predetermined size so as to seal around the fuel nozzle as much as possible without requiring any substantial effort to insert the fuel nozzle into the nozzle guide 34 or withdraw it. By way of example, a throat 40 having an inner diameter of 22.0 mm is considered a close fit for a fuel nozzle having a nominal outer diameter of 21.2 mm.

In view of this close fit, the tube 36 of the nozzle guide 34 has a counterbore 42. This counterbore 42 provides an annular vent passage around the fuel nozzle when it is inserted through the aperture 20 of the partition wall 18 via the fuel nozzle guide 34. This forms part of a vent system and splash guard feature that are described in detail below.

Figure 3:
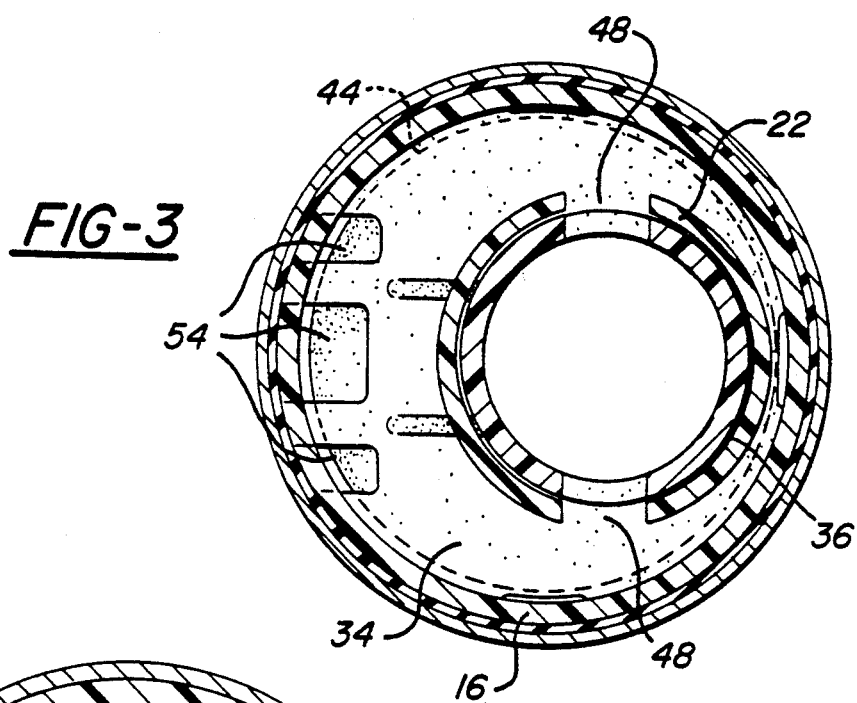
FIG. 3 is a section taken substantially along the line 3—3 of FIG. 1 looking in the direction of the arrows.

The nozzle guide 34 also includes a deflector flange 44 that engages an end of the housing 16 to form an outer annular vent chamber 46. The collar 22 and the tube 36 of the nozzle guide 34 have matching pairs of slots 48 diametrically opposite each other that establish communication between the counterbore 42 and the outer annular vent chamber 46 as shown in FIGS. 1 and 3. The nozzle guide 34 is also configured for easy molding.

The third component is a tubular retainer 50 that is attached to the end of the tubular housing 16 with the rim of the deflector flange 44 trapped between the end of the housing 16 and the end of the retainer 50 so as to hold the nozzle guide 34 in place. The housing 16 and the retainer 50 are held together by longitudinal barbed fingers at the end of the housing 16 that engage in slots in the end of the retainer 50. The fingers are resilient enough to permit snap-together assembly of the three components.

When the three components are assembled, the bell 38 of the nozzle guide 34 is disposed in the tubular retainer 50 and it has a periphery in close proximity to an inner surface of the retainer 50 so to form a second annular outer vent chamber 52 between the bell 38 and the deflector flange 44 of the nozzle guide 34. The deflector flange 44 has three parallel slots 54 that establish communication between the first and second outer annular chambers 46 and 52 as shown in FIGS. 1 and 3. The end of the tubular retainer 50 has an internal thread 56 that is used to attach the gas cap (not shown) and as a catch for engaging a retainer spring of the fuel nozzle when it is inserted into the fuel filler assembly 10.

Figure 4:
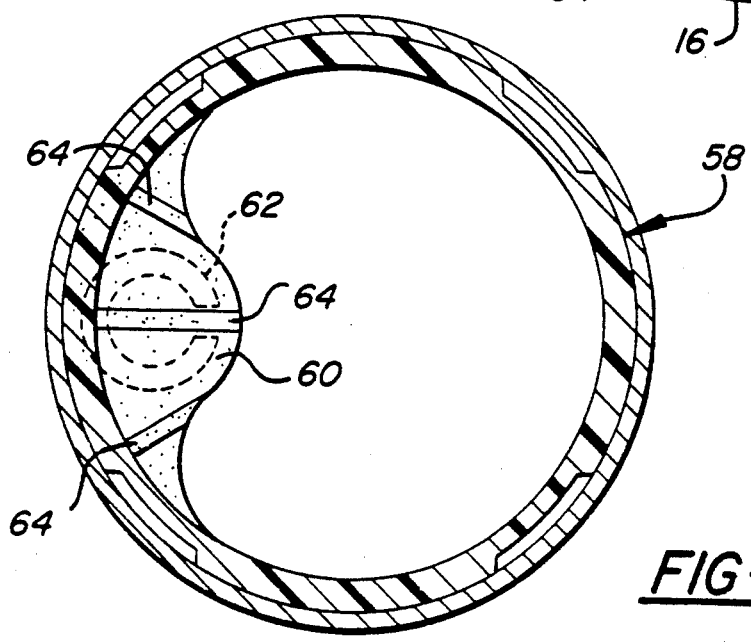
FIG. 4 is a section taken substantially along the line 4—4 of FIG. 1 looking in the direction of the arrows.

The fourth component is an optional vent tube retainer 58 attached to the opposite end of the housing 16 for those installations that have an internal rather than an external vent tube. The vent tube retainer 58 has a partial lateral wall 60. A slotted vent tube holder 62 is integrally attached to the bottom of the wall 60 for holding the end of a conventional flexible vent tube (not shown). Three circumferentially spaced, generally triangular deflector plates 64 are attached to the top of the wall 60 and the side wall of the retainer 58 as shown in FIGS. 1 and 4. The deflector plates 64 deflect the fuel nozzle away from the vent tube holder 62 when it is inserted through the aperture 20 in the partition wall 18. The vent tube retainer 58 is also configured for easy molding and it is also snap assembled to the housing 16 to facilitate economical manufacture.

The tubular housing 16 and the retainer housing 50 each have a shallow external circumferential groove 66 that holds an elastomeric band 68. The fuel filler module 10 is installed in the filler pipe 12 simply by inserting the module 10 in the filler pipe 12 and crimping the pipe 12 inwardly against the elastomeric bands 68 in the grooves 66 to retain the module 10 in place.

The vent system and splash guard feature operate as follows. During refuelling the fuel nozzle is inserted into the fuel filler module 10 until the tip extends through the aperture 20 and forces the trap door 26 to a generally vertical open position against the bias of the spring 30. This establishes a vent system for air trapped in the fuel tank that needs to escape as the fuel tank is being filled with gasoline. This vent system comprises a path from the inlet side of the housing 18 to the inner vent chamber formed by the counterbore 42 via the space in the aperture 20 around the fuel nozzle. The path continues to the first outer annular vent chamber 46 via the slots 48 and thence to the second outer annular chamber 52 via the slots 54 and finally out the open end of the module 10 via the space between the rim of the bell 38 and the inner wall of the tubular retainer 50.

When the refuelling nears completion, this same vent system provides a splash guard that prevents fuel splashing out the open end of the module 10 via the space between the fuel nozzle and the nozzle guide 38. As indicated earlier the throat 40 of the nozzle guide 38 has a close fit with the fuel nozzle. This close fit provides a restriction that resists fuel flow. On the other hand, the counterbore 22 and the large slots 48 offer comparatively little fuel flow resistance. Consequently, any surge of fuel that enters the counterbore 42 during the refuelling process flows laterally into the outer annular chamber 46 via the slots 48 rather than up through the space between the throat 40 and the fuel nozzle. The fuel entering the first outer annular chamber 46 does not splash back out the module opening due to the deflector flange 44 which deflects any fuel spray downwardly and channels the fuel into the second outer annular chamber 52. Here again, the fuel entering the second outer annular chamber 52 does not splash back out the module opening due to the bell 38 which deflects any fuel spray laterally and restricts fuel flow past the rim of the of the bell 38 due to the close proximity of the side wall of the retainer housing 50. Fuel nozzles are conventionally equipped with automatic shut-offs that should stop the refuelling process long before any fuel escapes from the second outer annular chamber 52. However, in the event that there is some small fuel escape, this fuel simply flows back down the nozzle guide 34 via the throat 40 when the fuel nozzle shuts off.

After refuelling, the open end of the filler pipe 12 is automatically sealed by closure of the trap door 26 under the bias of the spring 30 when the fuel nozzle is withdrawn from the fuel filler module 10.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A fuel filler module for a filler pipe of a fuel tank that automatically seals an open end of the filler pipe when a fuel nozzle is withdrawn comprising;
    a housing having a partition wall that separates the housing into an inlet side and an outlet side, the partition wall having an aperture that extends through it and that is sized to receive and vent around a fuel nozzle of predetermined size, the partition wall having a valve seat surrounding the aperture on the outlet side, a trap door pivotally mounted in the outlet side of the housing for movement between an open position and a closed position seated on the valve seat, a spring biasing the trap door to the closed position, a nozzle guide disposed in the inlet side of the housing, the nozzle guide having a tube at one end that is juxtaposed the aperture on the inlet side and a bell at the opposite end that leads to an internal throat that is sized to fit closely around the fuel nozzle of predetermined size, the one end of the nozzle guide being shaped to provide an annular vent passage when the nozzle of predetermined size is inserted through the aperture in the partition wall via the fuel nozzle guide, the nozzle guide having a deflector cooperating with the housing to form an outer annular vent chamber that communicates with the annular vent passage, and the bell of the nozzle guide cooperating with the housing to form a second outer annular vent chamber beneath the bell of the nozzle guide that communicates with the first outer annular outer vent chamber continuously.

2. The fuel filler module as defined in claim 1 wherein the bell of the nozzle guide has a periphery that is spaced from an inner surface of the housing so to form a passage for venting the second outer annular vent chamber to an open end of the module.

3. The fuel filler module as defined in claim 1 wherein the trap door is pivotally mounted in the outlet side of the door housing loosely so that the trap door centers itself on the valve seat when the trap door is in the closed position.

4. The fuel filler module as defined in claim 1 wherein the one end of the nozzle guide has a counterbore to provide the annular vent passage when the nozzle of predetermined size is inserted through the aperture in the partition wall via the fuel nozzle guide and the one end of the nozzle guide has at least one slot that intersects the counterbore to establish communication between the counterbore and the outer annular vent chamber.

5. The fuel filler module as defined in claim 1 wherein the nozzle guide has a flange that engages the housing to form the outer annular vent chamber and a tubular retainer is attached to the end of the tubular housing and engages the flange so as to hold the nozzle guide in place.

6. The fuel filler module as defined in claim 5 wherein the bell of the nozzle guide is disposed in the tubular retainer and has its periphery in close proximity to an inner surface of the retainer so to form the second annular outer vent chamber beneath the bell of the nozzle guide, and the flange has at least one slot for establishing communication between the first and second outer annular vent chambers.

7. A fuel filler module for a filler pipe of a fuel tank that automatically seals an open end of the filler pipe when a fuel nozzle is withdrawn comprising;

a housing having a partition wall that separates the housing into an inlet side and an outlet side, the partition wall having an aperture that extends through it and that is sized to receive and vent around a fuel nozzle of predetermined size, the partition wall having a valve seat surrounding the aperture on the outlet side, a trap door pivotally mounted in the outlet side of the housing for movement between an open position and a closed position seated on the valve seat, a spring biasing the trap door to the closed position, the trap door being pivotally mounted in the outlet side of the door housing loosely so that the trap door centers itself on the valve seat when the trap door is in the closed position, a nozzle guide disposed in the inlet side of the housing, the nozzle guide having a tube at one end that is juxtaposed the aperture on the inlet side and a bell at the opposite end that leads to an internal throat that is sized to fit closely around the fuel nozzle of predetermined size, the one end of the nozzle guide having a counterbore to provide an annular vent passage when the nozzle of predetermined size is inserted through the aperture in the partition wall via the fuel nozzle guide, the nozzle guide having a flange engaging the housing to form an outer annular vent chamber, the one end of the nozzle guide having at least one slot that establishes communication between the counterbore and the outer annular vent chamber, a tubular retainer that is attached to the end of the tubular housing so as to hold the nozzle guide in place, the bell of the nozzle guide being disposed in the tubular retainer and having a periphery in close proximity to an inner surface of the retainer so as to form a second annular outer vent chamber beneath the bell of the nozzle guide, and the flange having at least one slot for establishing communication between the first and second outer annular outer vent chambers.

8. A fuel filler module for a filler pipe of a fuel tank that seals the open end of the filler pipe automatically when a fuel nozzle is withdrawn comprising;

a tubular door housing having a partition wall that separates the housing into an inlet side and an outlet side, the partition wall having an aperture that extends through it and that is sized to receive and vent around a fuel filler nozzle of predetermined size, the partition wall having a collar surrounding the aperture on the inlet side and a conical valve seat surrounding the aperture on the outlet side, a trap door pivotally mounted in the outlet side of the door housing for movement between an open position and a closed position seated on the valve seat, a spring biasing the trap door to the closed position, the trap door having a conical face for engaging the conical valve seat and a seal ring disposed on the conical face for sealing an interface between the conical face and the conical valve seat when the trap door is in the closed position, the trap door being pivotally mounted in the outlet side of the door housing loosely so that the trap door centers itself on the conical valve seat when the trap door is in the closed position, a nozzle guide disposed in the inlet side of the housing, the nozzle guide having a tube at one end that fits in the collar and a bell at the opposite end that leads to an internal throat that is sized to fit closely around a fuel nozzle of predetermined size, the one end of the nozzle guide having a counterbore to provide an annular vent passage when a nozzle of predetermined size is inserted into the aperture in the partition wall via the fuel nozzle guide, the nozzle guide having a flange engaging an end of the housing to form an outer annular vent chamber, the one end of the nozzle guide having at least one slot that establishes communication between the counterbore and the outer annular vent chamber, a tubular retainer that is attached to the end of the tubular housing so as to hold the nozzle guide in place, the bell of the nozzle guide being disposed in the tubular retainer and having a periphery in close proximity to an inner surface of the retainer so to form a second outer annular vent chamber beneath the bell of the nozzle guide, the flange having at least one slot for establishing communication between the first and second outer annular vent chambers, and a vent tube retainer attached to the opposite end of the housing, the vent tube retainer having a partial lateral wall that has a depending vent tube holder, and deflector plates attached to the top of the partial wall and a side wall of the vent tube retainer for deflecting the fuel nozzle away from the vent tube holder when it is inserted through the aperture in the partition wall.

9. A fuel filler module for the filler pipe of a fuel tank that seals the open end of the filler pipe automatically when a fuel nozzle is withdrawn comprising;

a molded plastic tubular door housing of one piece construction having a partition wall that separates the housing into an inlet side and an outlet side, the partition wall having an aperture that extends through it and that is sized to receive and vent around a fuel filler nozzle of predetermined size, the partition wall having a collar surrounding the aperture on the outlet side, a trap door pivotally mounted in the outlet side of the door housing for movement between an open position and a closed position seated on the valve seat, means in the outlet side of the door housing biasing the trap door to the closed position, a molded plastic nozzle guide of one piece construction disposed in the inlet side of the housing, the nozzle guide having a tube at one end that fits in the collar and a bell at the opposite end that leads to an internal throat that is sized to fit closely around a fuel nozzle of predetermined size, the one end of the nozzle guide being shaped to provide an annular vent passage when a nozzle of predetermined size is inserted into the aperture in the partition wall via the fuel nozzle guide, the nozzle guide having a flange engaging an end of the housing to form an outer annular vent chamber and the one end of the nozzle guide having means for establishing communication between the annular vent passage and the outer annular vent chamber, a molded plastic tubular retainer of one piece construction that is attached to the end of the tubular housing so as to engage the flange and hold the nozzle guide in place, the bell of the nozzle guide being disposed in the tubular retainer and having a periphery in close proximity to an inner surface of the retainer so as to form a second outer annular vent chamber beneath the bell of the nozzle guide, and the flange having means for establishing communication between the first and second outer annular vent chambers.

10. The fuel filler module as defined in claim 9 further comprising a molded plastic vent tube retainer of one piece construction attached to the opposite end of the housing, the vent tube retainer having a partial end wall that has a depending vent tube holder, and deflector plates attached to the top of the partial end wall and a side wall of the vent tube retainer for deflecting the fuel nozzle away from the vent tube holder when it is inserted through the aperture in the partition wall.

* * * * *